May 31, 1938. N. COHEN 2,119,072
AUTOMOBILE FENDER COVER
Filed Dec. 27, 1937 3 Sheets-Sheet 1
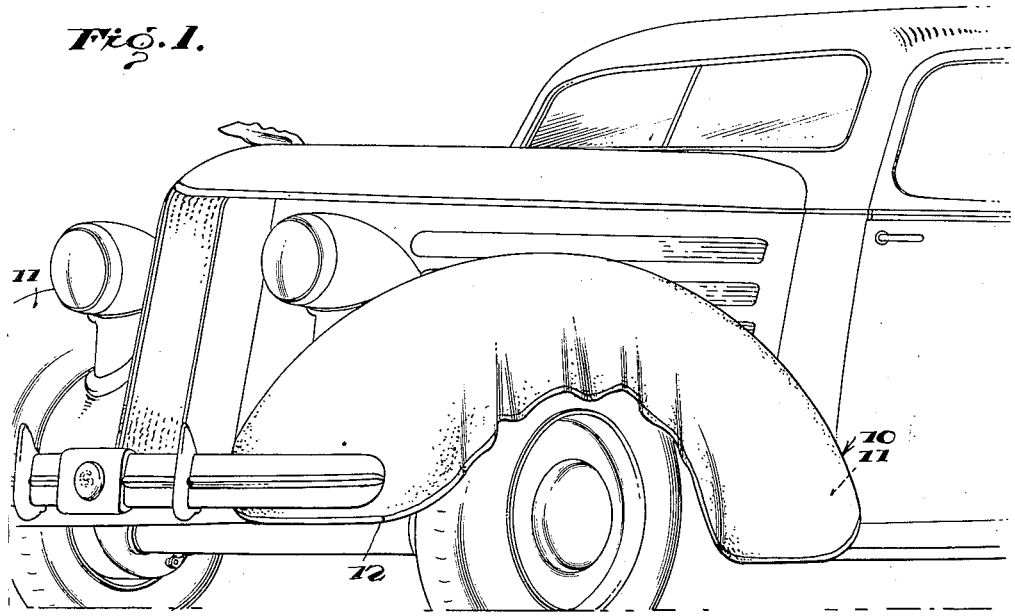
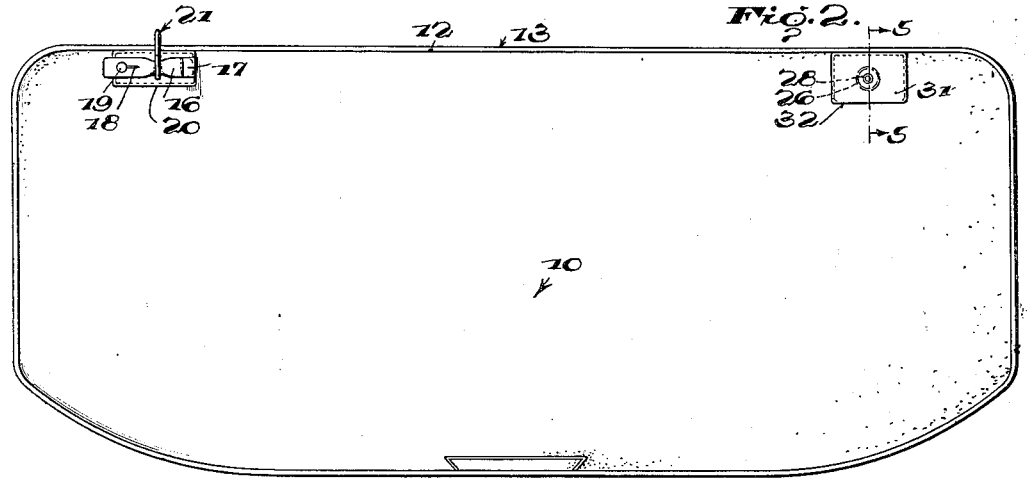
Inventor
Nathaniel Cohen May 31, 1938.  N. COHEN  2,119,072
AUTOMOBILE FENDER COVER
Filed Dec. 27, 1937   3 Sheets-Sheet 2
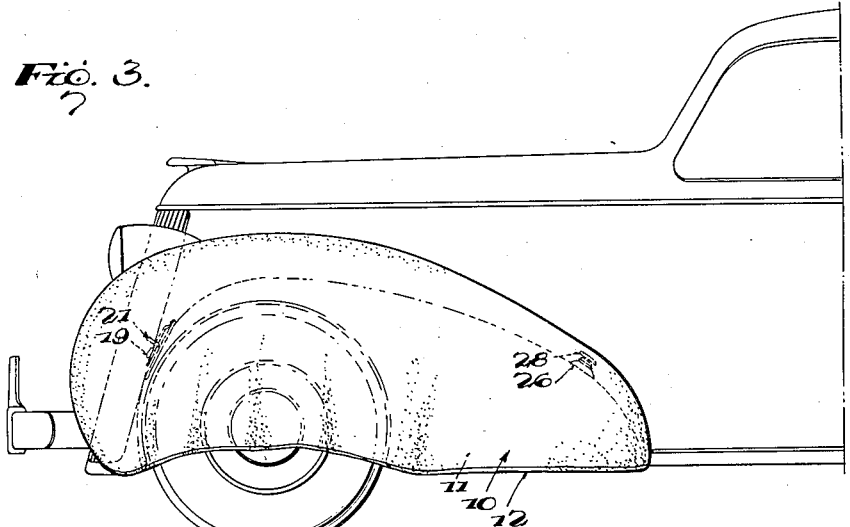
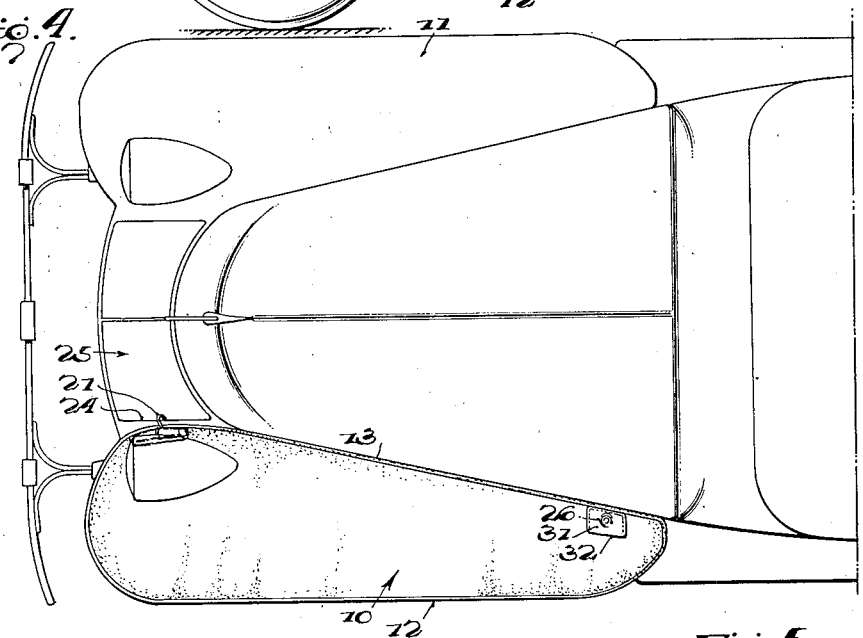
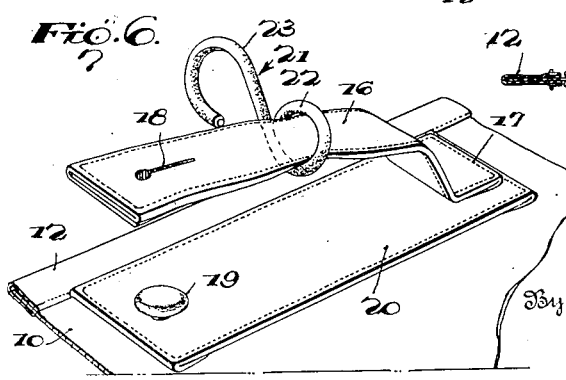
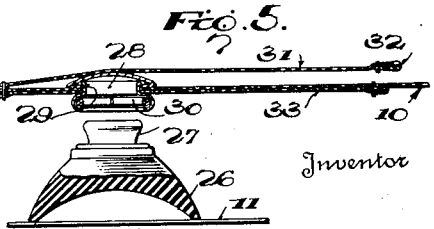
Inventor
Nathaniel Cohen
Attorney May 31, 1938.　　　　　N. COHEN　　　　　2,119,072
AUTOMOBILE FENDER COVER
Filed Dec. 27, 1937　　　3 Sheets-Sheet 3
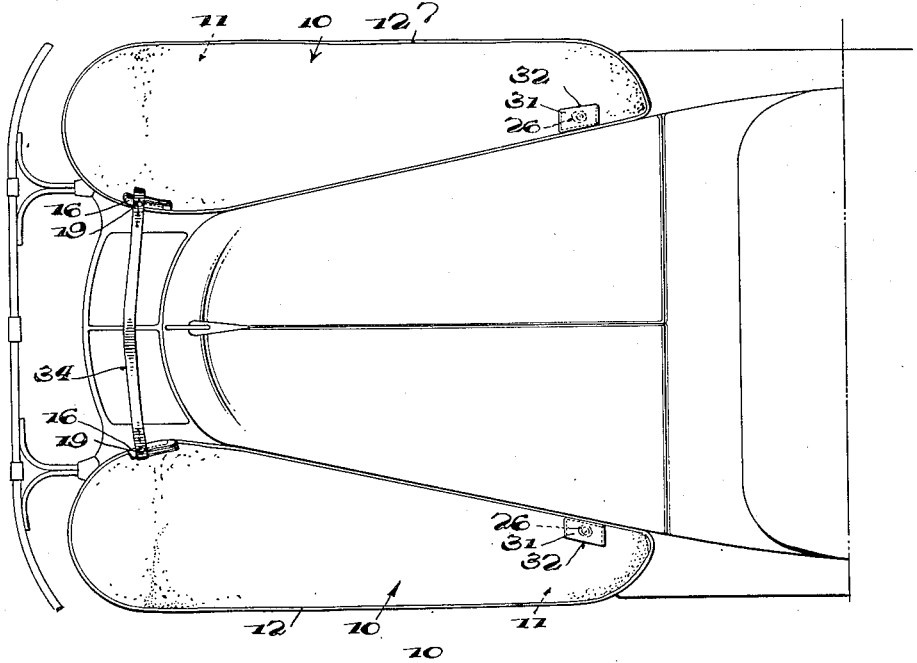
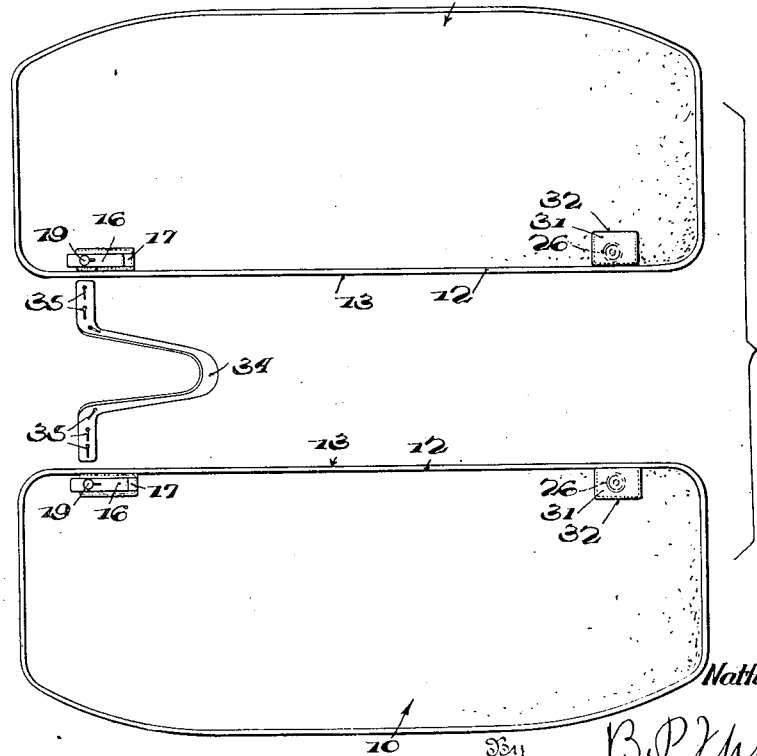
Inventor
Nathaniel Cohen
Attorney Patented May 31, 1938

2,119,072

UNITED STATES PATENT OFFICE 2,119,072

AUTOMOBILE FENDER COVER

Nathaniel Cohen, Newark, N. J., assignor, by direct and mesne assignments, to Stafast, Newark, N. J., a corporation of New Jersey Application December 27, 1937, Serial No. 181,850

13 Claims. (Cl. 280—150)

My invention is an automobile fender cover.

An important object of the invention is to provide a cover of the above mentioned character, which will protect the fender against grease, scarring, or other injury, which frequently occurs when a mechanic is working upon the automobile.

A further object of the invention is to provide a cover of the above mentioned character having means for quickly and conveniently attaching the cover to the fender, for holding the same against displacement.

A further object of the invention is to provide attaching means of the above mentioned character, which are extremely simple, and which are incapable of scratching or injuring the finish of the fender or adjacent portions of the automobile body.

A further object of the invention is to provide attaching means which are separable from the cover, so that the cover may be properly drycleaned or laundered.

Other objects and advantages of the invention will be apparent during the course of the following description.

In the accompanying drawings forming a part of this application and in which like numerals are employed to designate like parts throughout the same, Figure 1 is a perspective view of the front fender cover, showing the same applied, Figure 2 is a plan view of the same, removed, Figure 3 is a side elevation of the cover applied, Figure 4 is a plan view of the same, Figure 5 is a detailed section taken on line 5—5 of Figure 2, the suction cup being separated from the cover, Figure 6 is a perspective view of the hook carrying strap, Figure 6ª is a bottom plan view of a cover embodying a modified form of the invention, Figure 7 is a plan view of two connected fender covers embodying a further modified form of the invention, showing the same in use, and, Figure 8 is a plan view of the same removed.

Attention being called first to Figures 1 to 6 inclusive, the numeral 10 designates a fender cover, to be applied to the front fender of an automobile. The cover 10 is flexible so that it will conform to the contour of the fender 11 of the automobile, both longitudinally and transversely. This cover 10 is preferably formed of a woven fabric, such as cotton felt or cotton duvetyne. This fabric may be a duck or any other suitable stout woven fabric or any other suitably stout flexible material, such as artificial leather, oil cloth or the like. It is preferred to provide the cover 10 with a binding 12 at its edge, which may be stitched thereto. The cover 10 has a length corresponding generally to the length of the front fender 11, so that when the cover is applied to the front fender, it will extend over the entire length of the fender and will terminate slightly beyond and near the front and rear ends of the fender. This is the preferred arrangement, but the cover may extend considerably beyond the rear end of the fender if desired. The cover 10 preferably has an inner straight edge 13, and the cover has a sufficient width so that it will extend transversely from the inner edge of the fender outwardly over and beyond the outer edge of the fender, to completely cover the transverse area of the fender.

Means are provided to hold the forward end portion of the cover 10 in place. This means comprises a flexible strap 16, see more particularly Figures 1, 2 and 6. The rear end of this strap is attached to the cover 10 by stitching 17 or the like while its opposite end has a buttonhole 18, to detachably receive a preferably cloth covered button 19, attached to the cover 10, in the usual manner. It is preferred to arrange a reinforcing strip 20 beneath the strap 16, as shown, and this strip is stitched to the cover 10. The numeral 21 designates a hook, having an eye or loop 22, mounted upon the strap 16 and separable from the strap when the free end of the strap is disconnected from the button 19. The hook 21 preferably has a covering 23, formed of rubber or the like. The purpose of covering the button 19 and the hook is to prevent these elements from scratching or marring the finish or paint of the fender or body of the automobile. Particular attention is called to the fact that the hook 21 is secured to the cover 10 near and spaced from its forward end and adjacent to the inner longitudinal edge 13. The hook 21 is adapted to engage over a rib or element 24 of the radiator grill 25.

Arranged beneath the cover 10 near and spaced from its rear end and adjacent to the longitudinal edge 13 is a suction device or vacuum cup 26, of the conventional construction and formed of rubber or the like. This connection is preferably detachable and is effected by means of a snap fastener, including a stud element 27, secured to the vacuum cup 26. This stud element is adapted to be releasably held in a socket 28, which is secured within an opening 29, and is secured to the cover 10 by any suitable means so that it will not pull out. The socket is provided with a split resilient ring 30, for receiving the stud 27 therein, to normally hold the stud within the socket but to permit of the operation of the stud and socket, when desired. I prefer to cover the top of the socket 28 by a section of fabric 31, stitched to the cover 10 along the inner edge and opposite ends, leaving the outer longitudinal edge 32 open, so that access may be had to the top of the socket 28, when desired. The strip 31 serves to reinforce and strengthen the cover 10 adjacent to the socket and also completely covers the top of the socket so that it cannot scratch or mar the finish of the automobile. The cover 10 is also preferably reinforced upon its lower side, at the socket 28, by a section of fabric 33, stitched to the cover. It is preferred to have the hook 21 and suction cup 26 detachably connected with the cover so that these attaching elements may be removed from the cover to permit of the laundering or dry-cleaning of the cover.

In the use of this form of the invention, the cover 10 is applied to the upper surface of the fender, as shown in Figures 1, 3 and 4, and the inner edge 13 of the cover is arranged adjacent to and covers the meeting inner edge of the fender and chassis of the automobile. The hook 21 is now engaged over one of the elements 24 of the radiator grill 25, at a point near the lower end of the grill. The suction cup 26 which is now attached to the rear end portion of the cover 10 and arranged beneath the cover is attached to the upper surface of the fender by exerting pressure upon the top of the cover and releasing the same, as is obvious. At its forward and rear ends, the cover 10 extends beyond the corresponding ends of the fender for a suitable distance, ordinarily a short distance being sufficient, while the width of the cover is sufficient so that it extends completely over the transverse area of the fender from its inner longitudinal edge to and beyond its outer longitudinal edge, as shown in Figure 1, thus completely protecting the fender. The hook 21 and the suction cup 26 will securely hold the cover 10 in position upon the fender 11. These attaching elements being arranged adjacent to the inner longitudinal edge 13 of the cover will retain this inner edge adjacent to the inner edge of the fender and chassis so that the cover will extend over this inner edge. The advantage of employing the hook 21 and suction cup 26, is the ease and rapidity with which the cover may be applied by the mechanic to the fender 11, and securely held in place thereby. While I prefer to use the suction cup 26 in combination with the hook 21, yet I contemplate substituting a suction cup 21ª for the hook 21, so that there will be suction cups near the forward and rear ends of the cover 10, as clearly shown in Figure 6ª.

In Figures 7 and 8, I have two right and left covers 10 mounted upon the front fenders 11. These covers are equipped with the suction cups 26 secured to the same near their rear ends, as described in connection with the first form of the invention as shown in Figures 1 to 6 inclusive. The covers 10, Figures 7 and 8, are connected by a flexible element or strap 34. This strap is provided at its opposite ends with buttonholes 35, detachably receiving the buttons 19. The strap 34 may be used with the buttons without removing the straps 16.

In the use of the covers shown in Figures 7 and 8, these covers may be connected by the strap 34 and then applied to the fenders 11, the strap 34 extending across the grill 25 of the radiator. The suction cups 26 are then operated to have holding engagement with the upper surfaces of the fenders 11. The covers 10, Figures 7 and 8, are of course formed of the material or materials stated in connection with the cover 10 of Figures 1 and 2, and will readily conform to the contour of the fenders, and extend longitudinally throughout the entire length of the fenders, and transversely of the same from their inner longitudinal edges to and beyond their outer longitudinal edges.

It is to be understood that the forms of my invention herewith shown and described are to be taken as preferred examples of the same and that various changes in the size, shape, and arrangement of parts, may be resorted to, without departing from the spirit of my invention or the scope of the subjoined claims.

Having thus described my invention, what I claim is:

1. A cover for an automobile fender, a hook secured to the cover near its forward end to engage within the radiator shell, and a vacuum cup connected with the cover near its rear end to engage with a stationary part of the automobile.

2. A cover for the fender of an automobile, said cover being flexible to conform to the contour of the fender, an attaching element secured to the flexible cover near its forward end and near its inner edge for engagement with a part of the automobile, and a suction cup secured to the cover near its rear end and near its inner edge for engagement with a part of the automobile.

3. A cover for the fender of an automobile, said cover being flexible to conform to the contour of the fender, a hook connected with the forward portion of the cover to engage with the radiator shell, and a suction cup arranged upon the lower side of the cover and attached thereto for engagement with the fender.

4. A cover for an automobile fender, said cover being flexible to conform to the contour of the fender and corresponding generally to the length of the fender, an attaching element secured to the forward end portion of the cover near its inner edge to engage within the radiator shell, and a suction cup secured to the rear end portion of the cover near its inner edge and adapted for engagement with the fender.

5. A covering device for the front fenders of an automobile, said device comprising flexible covers to be arranged upon the front fenders to conform to the contour thereof, each cover being sufficiently long to extend over the forward and rear ends of the fender, means attached to the covers at points near and spaced from their forward ends for connecting the front end portions of the covers and extending generally horizontally across the radiator shell, and suction means for attaching the rear end portion of each cover to the fender.

6. A covering device for the front fenders of an automobile, comprising flexible covers to be arranged upon the front fenders and conforming to the contour thereof, each cover extending over the front and rear ends of the fender, a flexible connecting element detachably connected with the covers at points near and spaced from their forward ends, said flexible element extending generally horizontally across the radiator shell, and a suction cup connected with the rear end portion of each cover for retaining the same in place.

7. A cover for an automobile fender, said cover being flexible, and suction cups arranged upon one side of the cover near its opposite ends and secured to the cover.

8. A flexible cover for an automobile fender, a strap having one end attached to the cover and provided with a buttonhole, a button secured to the cover to be passed through the buttonhole, a hook having an eye to releasably receive the strap, and separate attaching means secured to the cover.

9. A flexible cover for an automobile fender, a suction cup arranged upon the lower side of the cover and attached to the cover, the cup covering the attachment, and a strip secured to the upper side of the cover and extending over the attachment.

10. A flexible cover for an automobile front fender, said cover being of a length to extend over substantially the entire length of the front fender for covering its front and rear ends, said cover also being of a width to extend transversely over the width of the fender from its inner edge to a point considerably outwardly of and beyond its outer edge, a strap attached to the cover near and spaced from its outer end and adjacent to its inner edge and having one end free, means for detachably connecting the free end of the strap with the cover, a hook having an eye to releasably receive the strap, said hook being adapted for engagement with the radiator shell, the hook being spaced from the forward end of the cover so that it will not disturb the arrangement of the forward end of the cover projecting over the forward end of the fender, a suction cup arranged near the rear end of the cover and adjacent to its inner edge, means for detachably securing the suction cup with the cover with the suction cup covering the attaching means so that it cannot mar the surface of the fender, the hook and suction cup serving to retain the cover in place upon the fender and holding the inner longitudinal edge of the cover against longitudinal and lateral displacement, the cover being free from other connections with the fender.

11. A flexible cover for an automobile front fender, said cover having a length corresponding generally to the length of the fender so that the cover extends over the front and rear ends of the fender and having a width considerably greater than the width of the fender so that the cover extends from the inner edge of the fender to and beyond its outer edge, a mechanical attaching element secured to the cover adjacent to its inner longitudinal edge and near and spaced from its forward end and adapted for detachable engagement with the radiator shell, and a suction cup attached to the rear end portion of the cover adjacent to its inner longitudinal edge and arranged to engage with the fender adjacent its inner longitudinal edge, the cover being free from other connections with the fender, the attaching element and suction cup serving to hold the inner longitudinal edge of the cover against longitudinal and lateral displacement.

12. A covering device for the front fenders of an automobile, comprising flexible covers to be arranged upon the front fenders, said flexible covers extending over the opposite ends of the fenders, a strap attached at one end to each cover at a point near and spaced from its forward end and having a free end provided with a buttonhole, a button secured to the cover to engage within the buttonhole, the strap serving to reinforce the cover and being also adapted to receive the eye of a hook to engage with the radiator shell, a strap having buttonholes at its ends to receive the buttons of the two covers, and means arranged near the rear end of each cover for holding such end in position.

13. A flexible cover for an automobile front fender, said cover being of a length to extend over substantially the entire length of the front fender for covering its front and rear ends, said cover also being of a width to extend transversely over the entire width of the fender from its inner edge to its outer edge, an attaching element secured to the cover near its outer end and adjacent to its inner edge for detachable engagement with an adjacent part of the automobile, and a second attaching element secured to the cover near its rear end and adjacent to its inner edge for detachably engaging with an adjacent part of the automobile, the attaching elements constituting the sole connecting means between the cover and the automobile, the attaching elements serving to oppose longitudinal and lateral displacement of the inner edge of the cover.

NATHANIEL COHEN.